US007465040B2

(12) United States Patent
Malik et al.

(10) Patent No.: US 7,465,040 B2
(45) Date of Patent: Dec. 16, 2008

(54) LABYRINTH SEAL STRUCTURE WITH REDUNDANT FLUID FLOW PATHS

(75) Inventors: Craig L. Malik, Corvallis, OR (US); Rhonda L. Wilson, Corvallis, OR (US); Benjamin Zoladz, Corvallis, OR (US); Norman E. Pawlowski, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 430 days.

(21) Appl. No.: 11/188,480

(22) Filed: Jul. 25, 2005

(65) Prior Publication Data

US 2005/0270343 A1 Dec. 8, 2005

Related U.S. Application Data

(63) Continuation-in-part of application No. 11/041,047, filed on Jan. 21, 2005, which is a continuation of application No. 10/280,441, filed on Oct. 25, 2002, now Pat. No. 6,886,929.

(51) Int. Cl.
*B41J 2/175* (2006.01)
*B01D 21/30* (2006.01)

(52) U.S. Cl. .......................................... 347/85; 210/136

(58) Field of Classification Search .................. 347/85, 347/94, 86; 138/43; 137/513.7, 852, 87.04; 239/542, 428.5; 604/248, 228; 123/188.6; 324/753; 210/322, 136, 97
See application file for complete search history.

(56) References Cited

U.S. PATENT DOCUMENTS 1,964,300 A * 6/1934 Perry et al. .................. 138/43
2,511,733 A * 6/1950 Morrison .................... 138/43
3,550,616 A * 12/1970 Graham et al. ........... 137/513.7
3,572,377 A * 3/1971 Graham et al. ........... 137/513.7
3,700,111 A * 10/1972 Bode .......................... 210/322
3,792,588 A * 2/1974 Gilaad ........................ 239/542
3,877,428 A * 4/1975 Seagle et al. ................ 604/248
3,979,070 A * 9/1976 Lemelshtrich .............. 239/542
4,074,284 A 2/1978 Dexter
4,215,822 A * 8/1980 Mehoudar ................... 239/542
4,431,019 A * 2/1984 Kopp et al. .............. 137/87.04
4,533,083 A * 8/1985 Tucker ....................... 239/542
4,575,738 A * 3/1986 Sheufelt et al. ............... 347/94
4,712,583 A * 12/1987 Pelmulder et al. ........... 137/852
4,777,497 A 10/1988 Nozu et al.
4,884,451 A 12/1989 Schulze
4,917,687 A * 4/1990 O'Boyle ..................... 604/248
4,942,383 A 7/1990 Lam et al.
4,967,594 A 11/1990 Ehrenfried
5,062,397 A * 11/1991 Larson .................... 123/188.6
5,619,022 A 4/1997 Long
5,644,285 A 7/1997 Maurer
5,803,368 A * 9/1998 Shekalim ................. 239/428.5
6,079,266 A 6/2000 Wright
6,164,743 A 12/2000 Hmelar et al.

(Continued)

FOREIGN PATENT DOCUMENTS

JP 09250943 * 9/1997

*Primary Examiner*—Stephen D Meier
*Assistant Examiner*—Carlos A Martinez, Jr.

(57) ABSTRACT

A labyrinth seal structure includes a gland structure for providing a fluid seal between a first surface and a second surface, and redundant labyrinth fluid flow paths between a first side of the seal structure and a second side of the seal structure.

35 Claims, 14 Drawing Sheets

U.S. PATENT DOCUMENTS

| | | | | |
|---|---|---|---|---|
| 6,183,076 | B1 | 2/2001 | Childers | |
| 6,435,638 | B1 | 8/2002 | Wilson et al. | |
| 6,467,354 | B1 | 10/2002 | Allen | |
| 6,752,789 | B2 * | 6/2004 | Duchon et al. | 604/228 |
| 6,886,929 | B2 * | 5/2005 | Malik et al. | 347/86 |
| 2003/0005782 | A1 | 1/2003 | McDonald et al. | |
| 2003/0052702 | A1 * | 3/2003 | Auburger et al. | 324/753 |

* cited by examiner

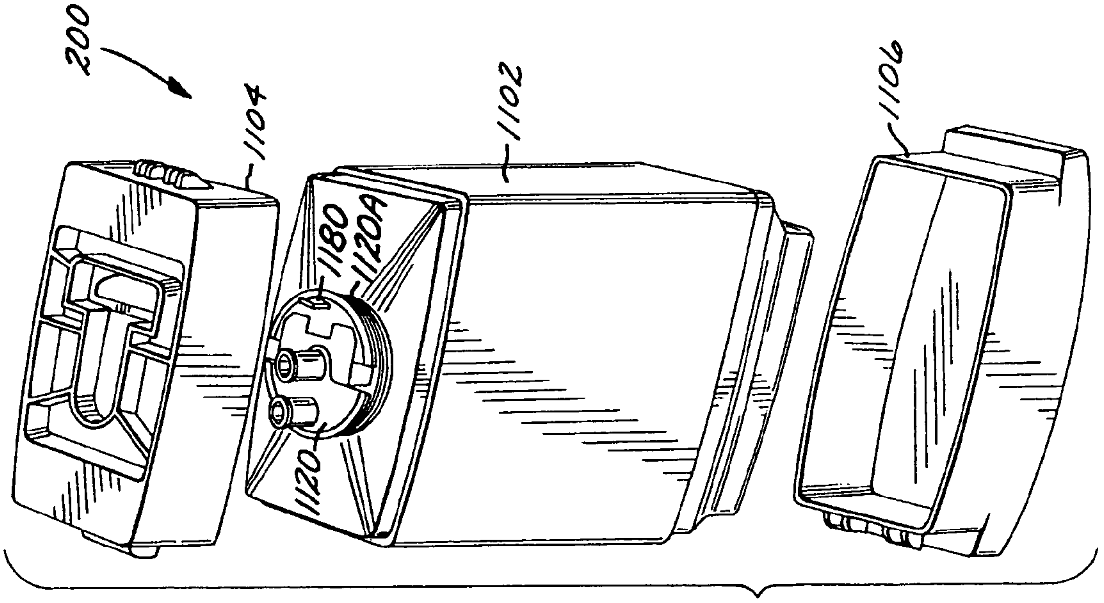
FIG. 6
FIG. 7
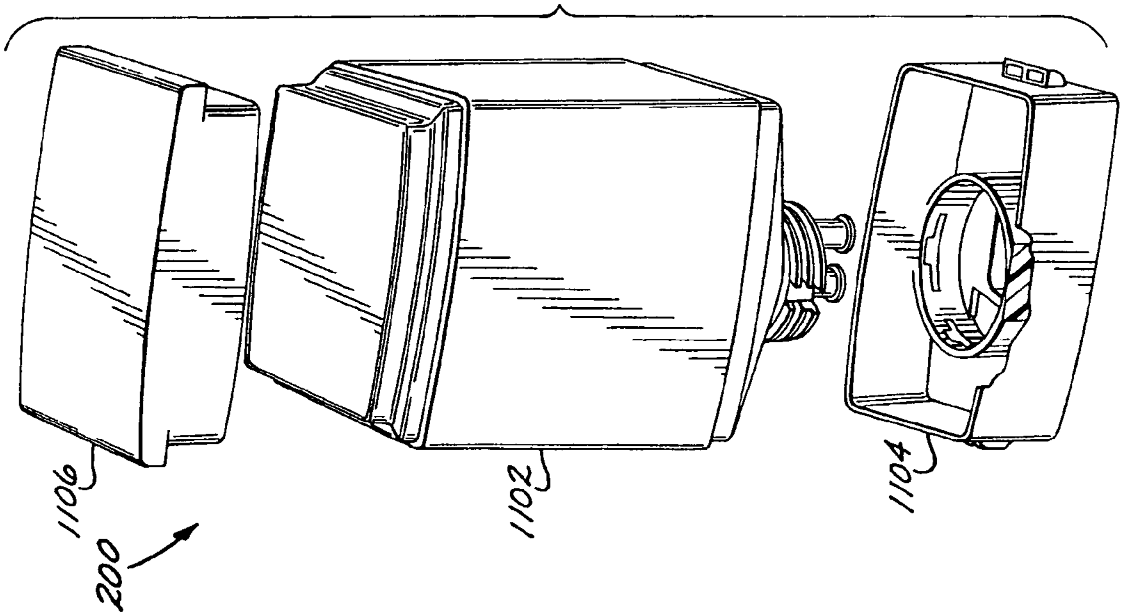

FIG. 17
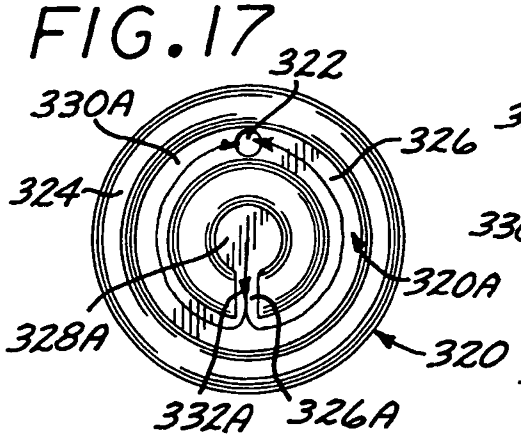
FIG. 18
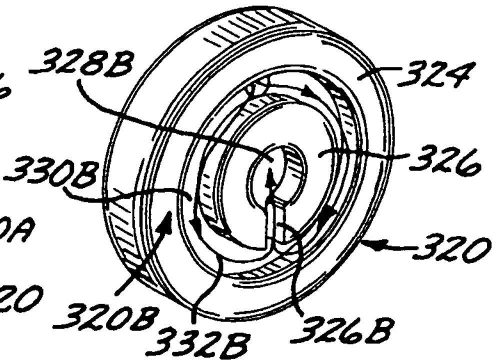
FIG. 19
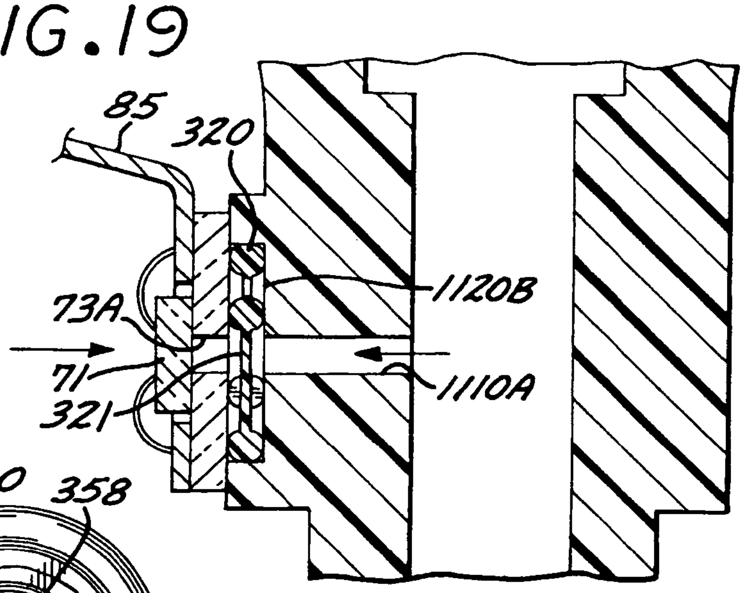
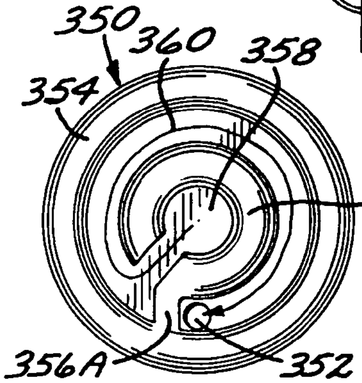
FIG. 21
FIG. 20
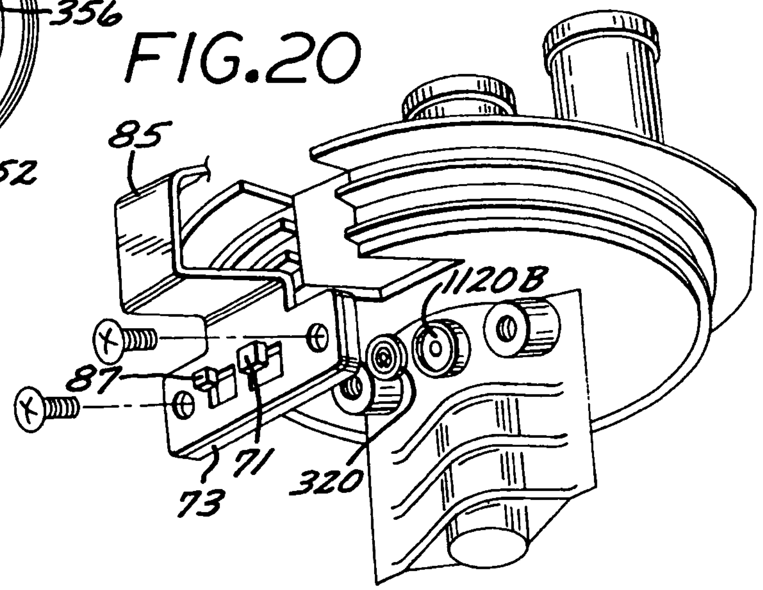

FIG. 22
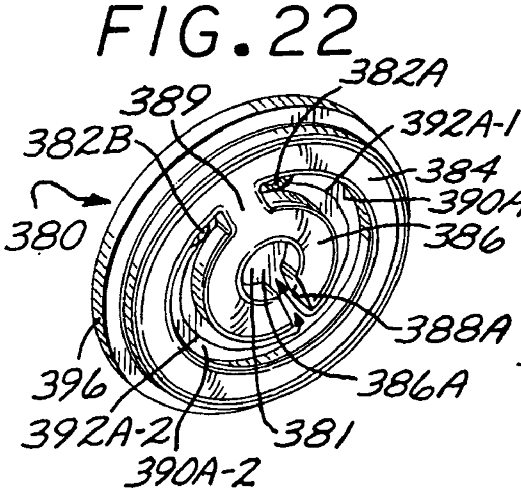
FIG. 23
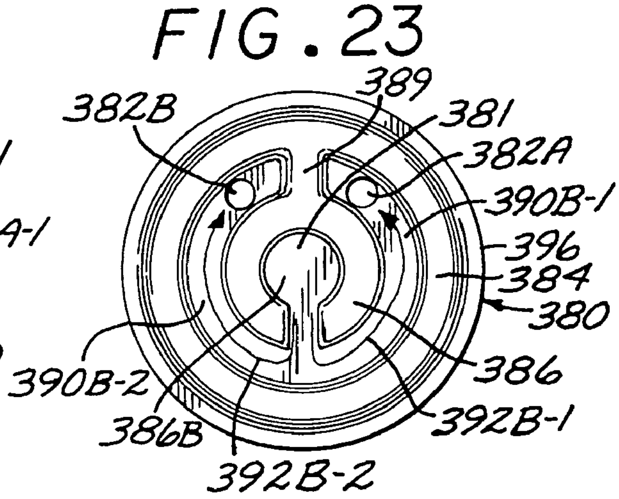
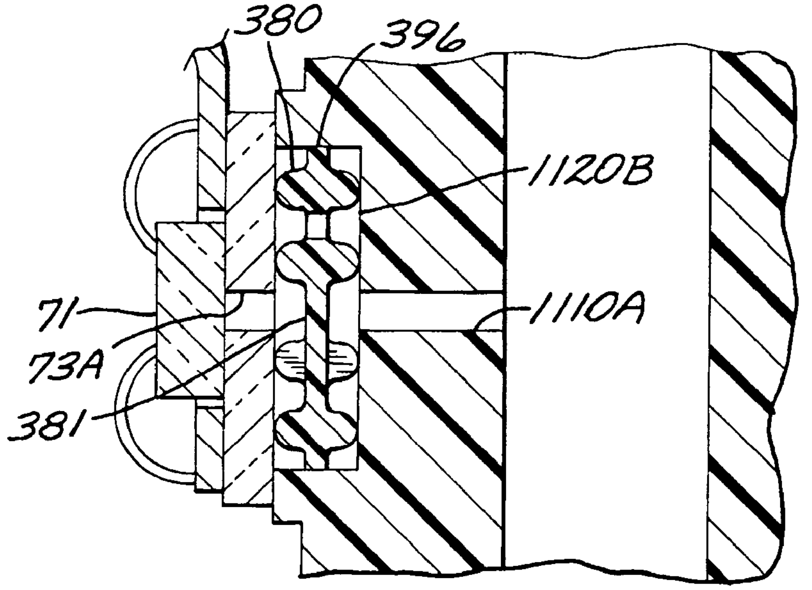
FIG. 24

FIG. 25
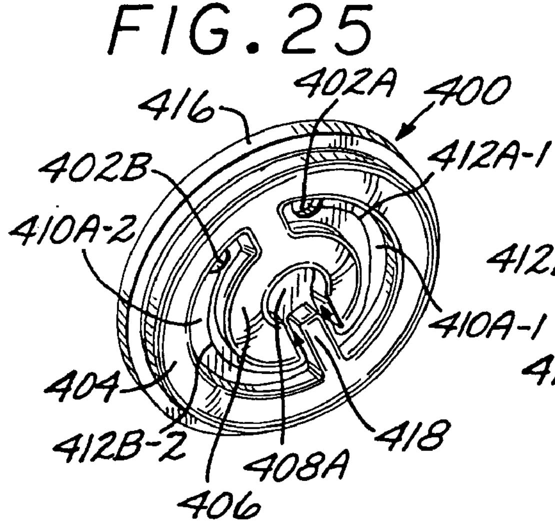
FIG. 26
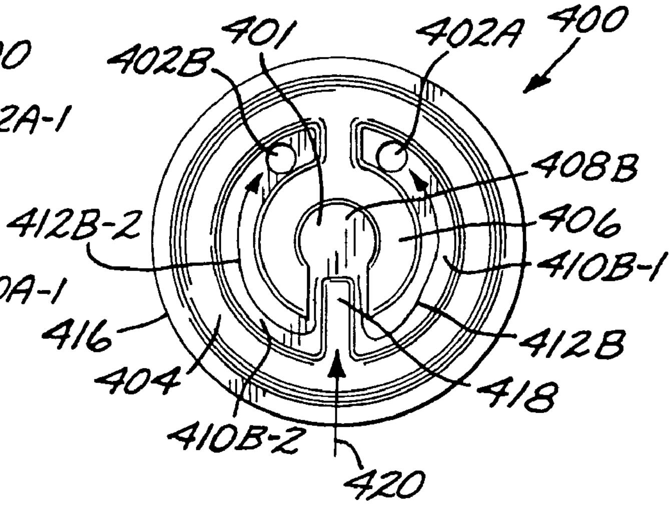
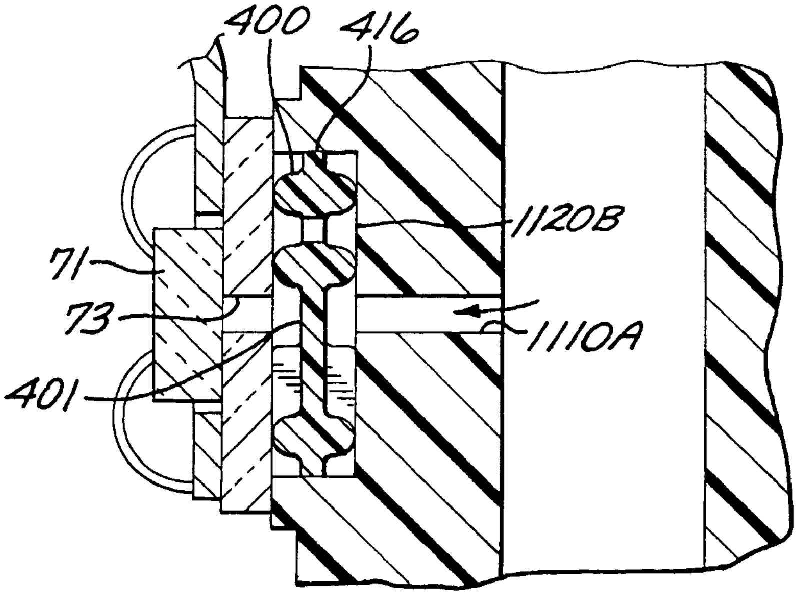
FIG. 27

LABYRINTH SEAL STRUCTURE WITH REDUNDANT FLUID FLOW PATHS

CROSS-REFERENCE TO RELATED APPLICATIONS

This application is a continuation-in-part of application Ser. No. 11/041,047, filed Jan. 21, 2005, in turn a continuation of application Ser. No. 10/280,441, filed Oct. 25, 2002, now U.S. Pat. No. 6,886,929.

BACKGROUND

The art of inkjet printing is relatively well developed. Commercial products such as computer printers, graphics plotters, and facsimile machines have been implemented with ink jet technology for producing printed media. Generally, an ink jet image is formed pursuant to precise placement on a print medium of ink drops emitted by an ink drop generating device known as an ink jet printhead. Some known printers make use of an ink container that is separably replaceable from the printhead. When the ink container is exhausted it is removed and replaced with a new ink container. The use of replaceable ink containers that are separate from the printhead allow users to replace the ink container without replacing the printhead. The printhead is then replaced at or near the end of printhead life, and not when the ink container is replaced.

A consideration with ink jet printing systems that employ ink containers that are separate from the printheads is to predict an out of ink condition for an ink container. In such ink jet printing systems, it is important that printing cease when an ink container is nearly empty with a small amount of stranded ink. Otherwise, printhead damage may occur as a result of firing without ink, and/or time is wasted in operating a printer without achieving a complete printed image.

Inkjet cartridges with integrated pressure sensing elements are known in the art, such as described in U.S. Pat. No. 6,435,638, INK BAG FITMENT WITH AN INTEGRATED PRESSURE SENSOR FOR LOW INK DETECTION. A purpose of the pressure sensing element is to measure changes in the pressure of the ink or fluid being delivered to the printhead over the ink cartridge lifetime, to provide data for indicating ink level and out-of-ink information.

A challenge for ink cartridges with integrated pressure sensors is protecting the sensor from pressure spikes, which commonly occur during manufacturing, shipping or handling, and can occur due to dropping the cartridge.

BRIEF DESCRIPTION OF THE DRAWINGS

Features and advantages of the disclosure will readily be appreciated by persons skilled in the art from the following detailed description when read in conjunction with the drawing wherein:

FIG. 6 is a schematic isometric exploded view illustrating exemplary major components of an implementation of one of the ink containers of the exemplary printer/plotter system of FIG. 1.

FIG. 7 is a further schematic isometric exploded view illustrating exemplary major components of an implementation of one of the ink containers of the exemplary printer/plotter system of FIG. 1.

FIG. 17 is a bottom view of an embodiment of a labyrinth o-ring structure as another technique for improving robustness of a pressure sensor to pressure shocks.

FIG. 18 is an isometric top view of the labyrinth o-ring structure of FIG. 17.

FIG. 19 is a broken-away cross-sectional view of a portion of the ink container of FIG. 10, and showing the labyrinth o-ring structure of FIGS. 17-18 in place.

FIG. 20 is an exploded view illustrating the pressure transducer and the chassis member of the ink container of FIGS. 6 and 7, and showing the labyrinth o-ring structure of FIGS. 17-18.

FIG. 21 is a front view of an alternated embodiment of a labyrinth o-ring structure for improving robustness of a pressure sensor to pressure shocks.

FIG. 22 is an isometric view of an exemplary embodiment of a labyrinth seal structure.

FIG. 23 is a bottom view of the labyrinth seal structure of FIG. 22.

FIG. 24 is a broken-away cross-sectional view of a portion of the ink container of FIG. 10, and showing the labyrinth seal structure of FIGS. 22-23 in place.

FIG. 25 is an isometric view of another alternate exemplary embodiment of a labyrinth seal structure.

FIG. 26 is a bottom view of the labyrinth seal structure of FIG. 25.

FIG. 27 is a broken-away cross-sectional view of a portion of the ink container of FIG. 10, and showing the labyrinth seal structure of FIGS. 25-26 in place.

DETAILED DESCRIPTION

Figure 1:
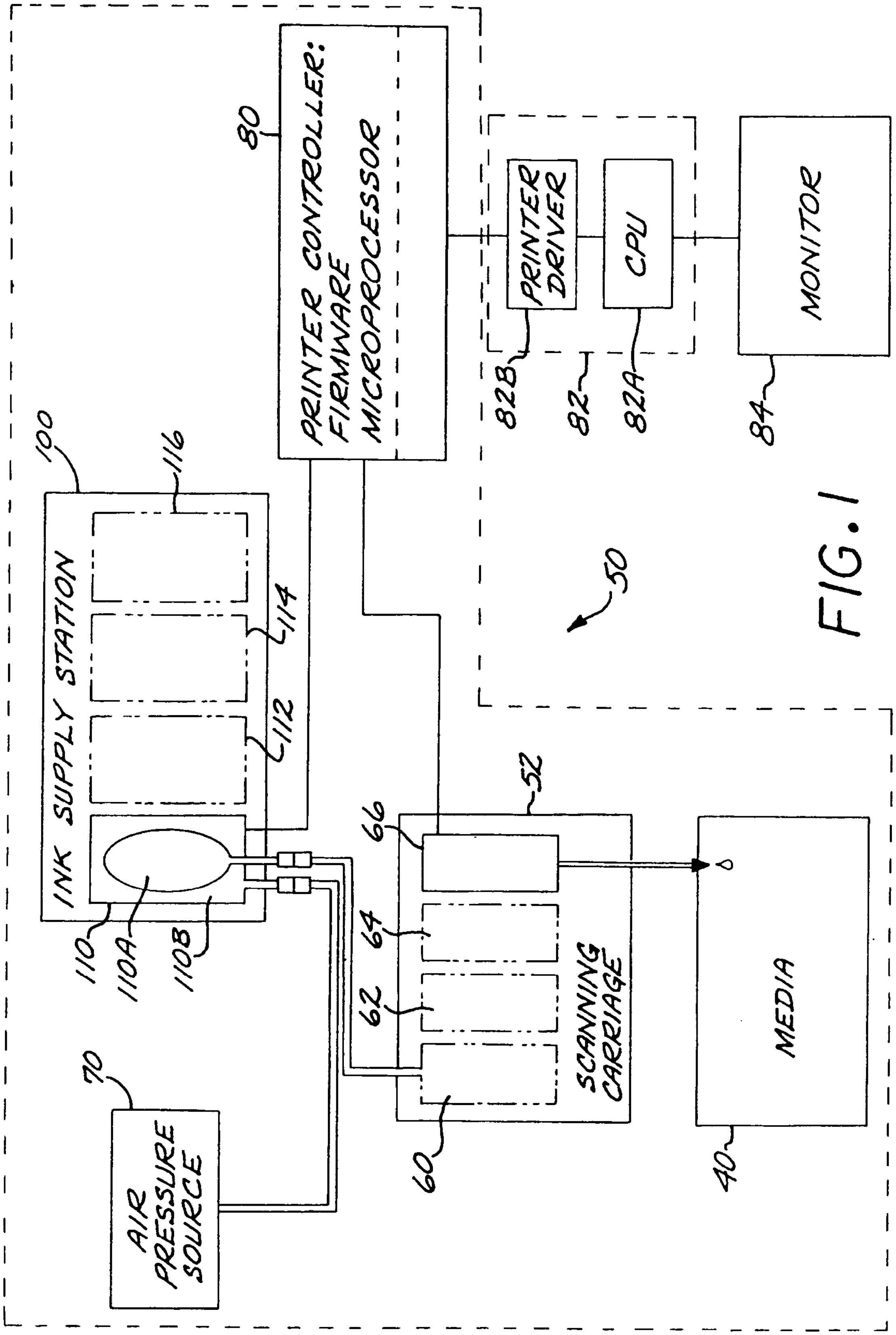
FIG. 1 is a schematic block diagram of an exemplary printer/plotter system in which an ink level sensing circuit can be employed.

In the following detailed description and in the several figures of the drawing, like elements are identified with like reference numerals. The figures are not to scale, and relative feature sizes may be exaggerated for illustrative purposes.

Figure 2:
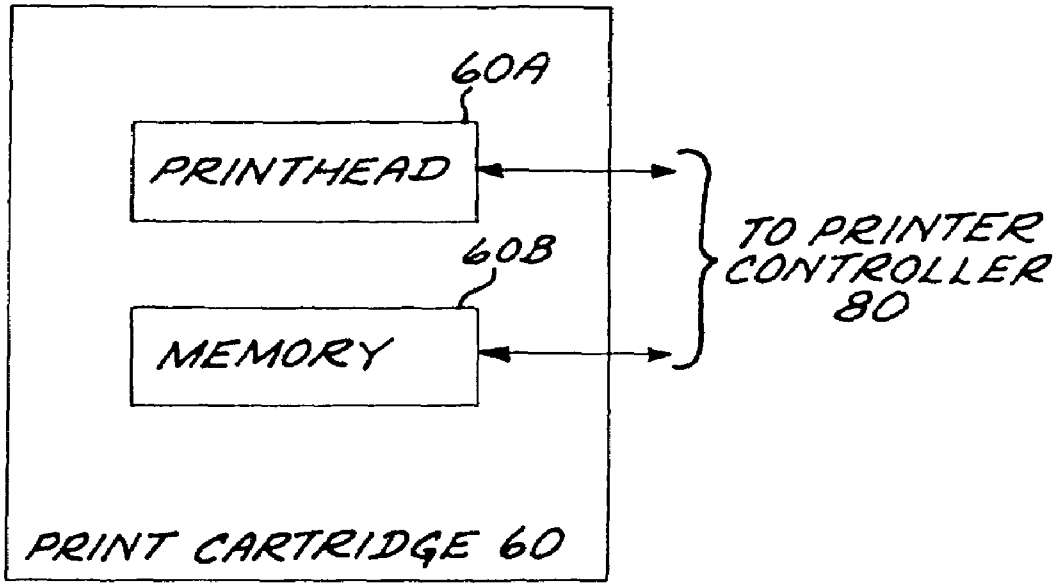
FIG. 2 is a schematic block diagram depicting exemplary major components of one of the print cartridges of the exemplary printer/plotter system of FIG. 1.

Referring now to FIG. 1, set forth therein is a schematic block diagram of an exemplary printer/plotter 50 in which the invention can be employed. A scanning print carriage 52 holds a plurality of print cartridges 60-66 which are fluidically coupled to an ink supply station 100 that supplies pressurized ink to the print cartridges 60-66. By way of illustrative example, each of the print cartridges 60-66 comprises an ink jet printhead and an integral printhead memory, as schematically depicted in FIG. 2 for the representative example of the print cartridge 60 which includes an ink jet printhead 60A and an integral printhead memory 60B. Each print cartridge has a fluidic regulator valve that opens and closes to maintain a slight negative gauge pressure in the cartridge that is optimal for printhead performance. The ink provided to each of the print cartridges 60-66 is pressurized to reduce the effects of dynamic pressure drops.

The ink supply station 100 contains receptacles or bays for accepting ink containers 110-116 which are respectively associated with and fluidically connected to respective print cartridges 60-66. Each of the ink containers 110-114 includes a collapsible ink reservoir, such as collapsible ink reservoir 110A that is surrounded by an air pressure chamber 110B. An air pressure source or pump 70 is in communication with the air pressure chamber for pressurizing the collapsible ink reservoir. For example, one pressure pump supplies pressurized air for all ink containers in the system. Pressurized ink is delivered to the print cartridges by an ink flow path that includes for example respective flexible plastic tubes connected between the ink containers 110-116 and respectively associated print cartridges 60-66.

Figure 3:
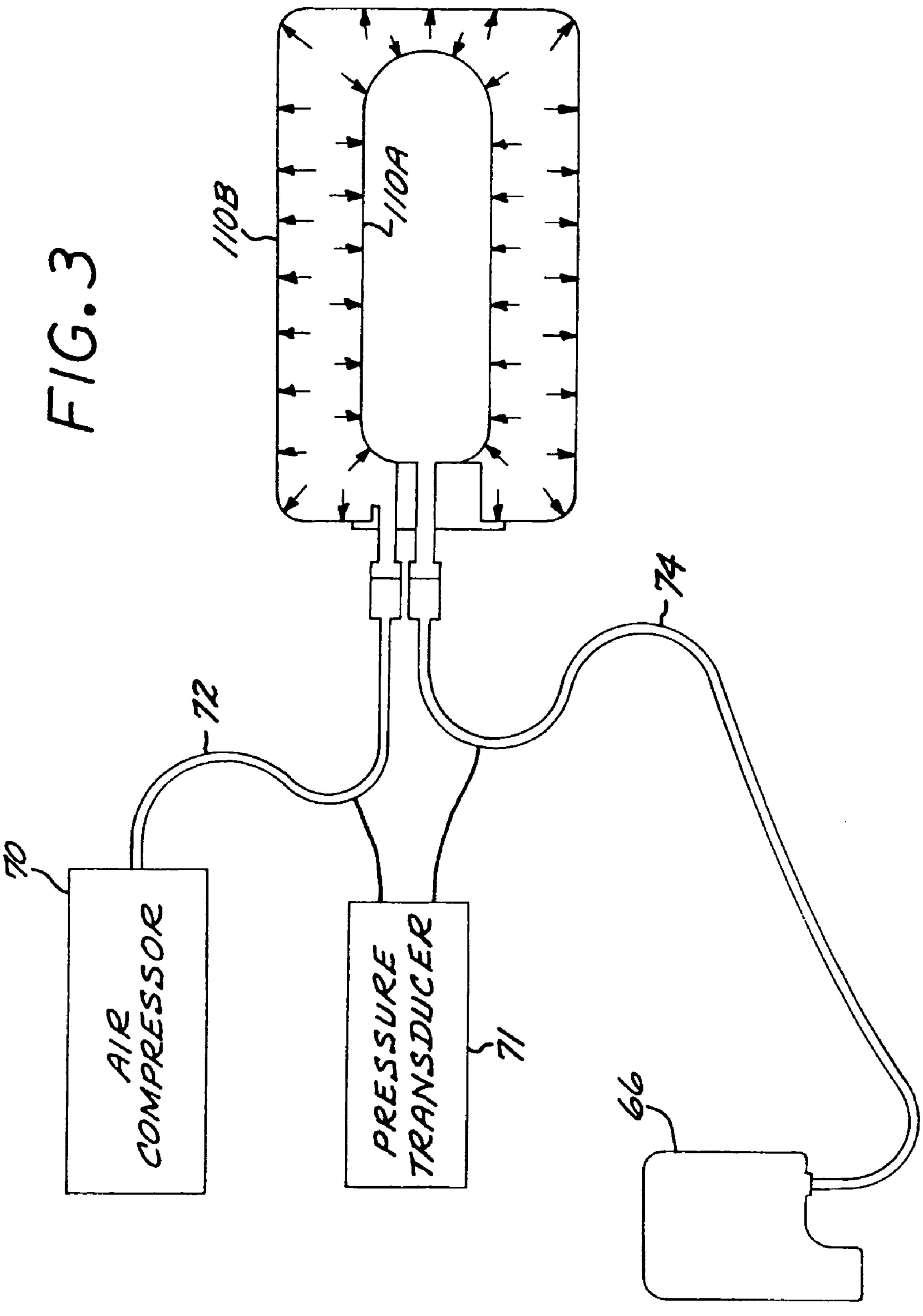
FIG. 3 is a schematic block diagram illustrating in a simplified manner an exemplary connection between an off-carriage ink container, an air pressure source, and an on-carriage print cartridge of the exemplary printer/plotter system of FIG. 1.

FIG. 3 is a simplified diagrammatic view illustrating the pressure source 70, an air pressure line 72 that delivers pressurizing gas to the pressure chamber 110B which pressurizes the collapsible ink reservoir 110*a* so as to cause ink to be delivered to the printhead cartridge via an ink supply line 74. A pressure transducer 71 is provided for detecting a pressure differential between air that is pressurizing the collapsible ink reservoir 110*a* and a pressure indicative of pressure in the collapsible ink reservoir 110*a*. For example, the pressure transducer 71 is in communication with the ink supply line 74 and the air pressure line 72. Alternatively, the pressure transducer 71 is disposed in the pressure chamber 110B, as illustrated in FIGS. 11-15, and senses an ink pressure in the collapsible ink reservoir 110*a* and a pressure in the pressure chamber 110B. As a further alternative, the pressure transducer 71 is an absolute pressure sensor that senses absolute pressure of ink in the ink supply line 74 or in the collapsible ink reservoir 110*a*.

Figure 4:
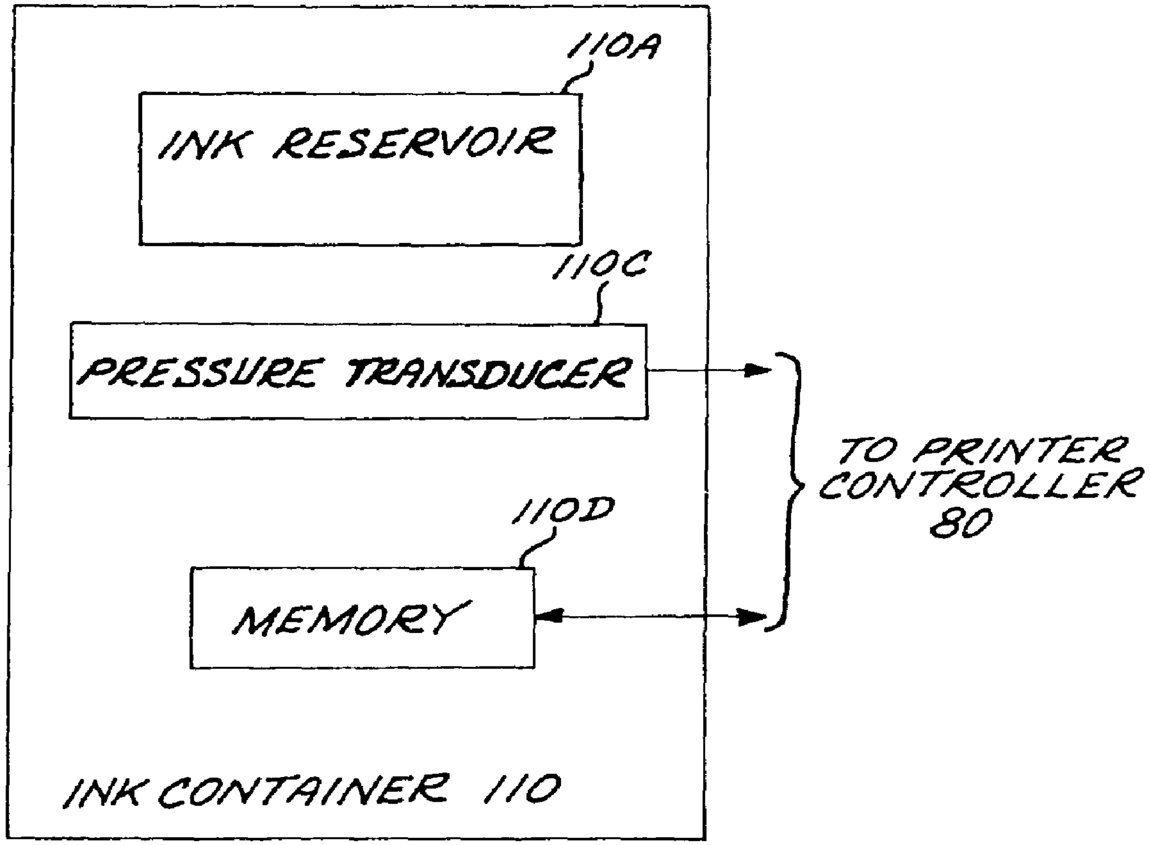
FIG. 4 is a schematic block diagram depicting exemplary major components of one of the ink containers of the exemplary printer/plotter system of FIG. 1.

Each of the ink containers includes a collapsible ink reservoir and an optional integral ink cartridge memory. Schematically depicted in FIG. 4 is a representative example of the ink container 110 that more particularly includes an ink reservoir 110A, an integral ink cartridge memory 110D, and a pressure transducer 110C.

Continuing to refer to FIG. 1, the scanning print carriage 52, the print cartridges 60-66, and the ink containers 110-114 are electrically interconnected to a printer microprocessor controller 80 that includes printer electronics and firmware for the control of various printer functions, including for example analog-to-digital converter circuitry for converting the outputs of the ink level sensing pressure transducers 71 associated with the ink containers 110-116. The controller 80 thus controls the scan carriage drive system and the printheads on the print carriage to selectively energize the printheads, to cause ink droplets to be ejected in a controlled fashion on the print medium 40. The printer controller 80 further detects a low level of remaining ink volume in each of the ink containers 110-114 pursuant to the output of the associated pressure transducer 71.

A host processor 82, which includes a CPU 82A and a software printer driver 82B, is connected to the printer controller 82. For example, the host processor 82 comprises a personal computer that is external to the printer 50. A monitor 84 is connected to the host processor 82 and is used to display various messages that are indicative of the state of the ink jet printer. Alternatively, the printer can be configured for stand-alone or networked operation wherein messages are displayed on a front panel of the printer.

Figure 5:
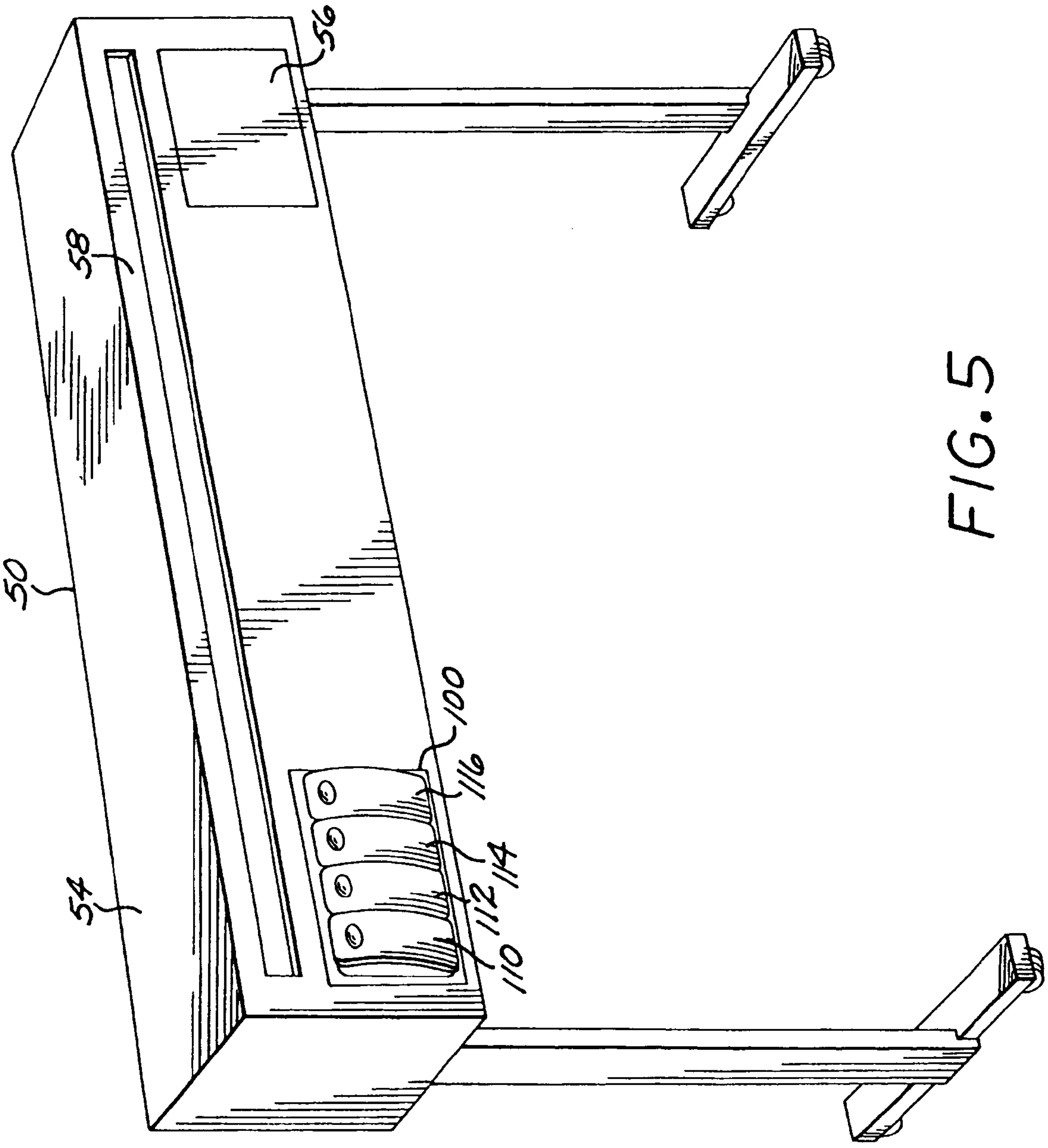
FIG. 5 is a simplified isometric view of an exemplary implementation of the exemplary printer/plotter system of FIG. 1.

FIG. 5 shows in isometric view an exemplary form of a large format printer/plotter in which the invention can be employed, wherein four off-carriage (or off-axis) ink containers 110, 112, 114, 116 are shown installed in an ink supply station. The printer/plotter of FIG. 5 further includes a housing 54, a front control panel 56 which provides user control switches, and a media output slot 58. While this exemplary printer/plotter is fed from a media roll, it should be appreciated that alternative sheet feed mechanisms can also be used.

Referring now to FIGS. 6-14, schematically illustrated therein is a specific implementation of an ink container 200, which can be implemented as each of the ink containers 110-116 that are structurally substantially identical.

As shown in FIGS. 6-7, the ink container 200 generally includes an outer container or pressure vessel 1102, a chassis member 1120 attached to a neck region 1102A at a leading end of the pressure vessel 1102, a leading end cap 1104 attached to the leading end of the pressure vessel, and a trailing end cap 1106 attached to the trailing end of the pressure vessel 1102.

Figure 8:
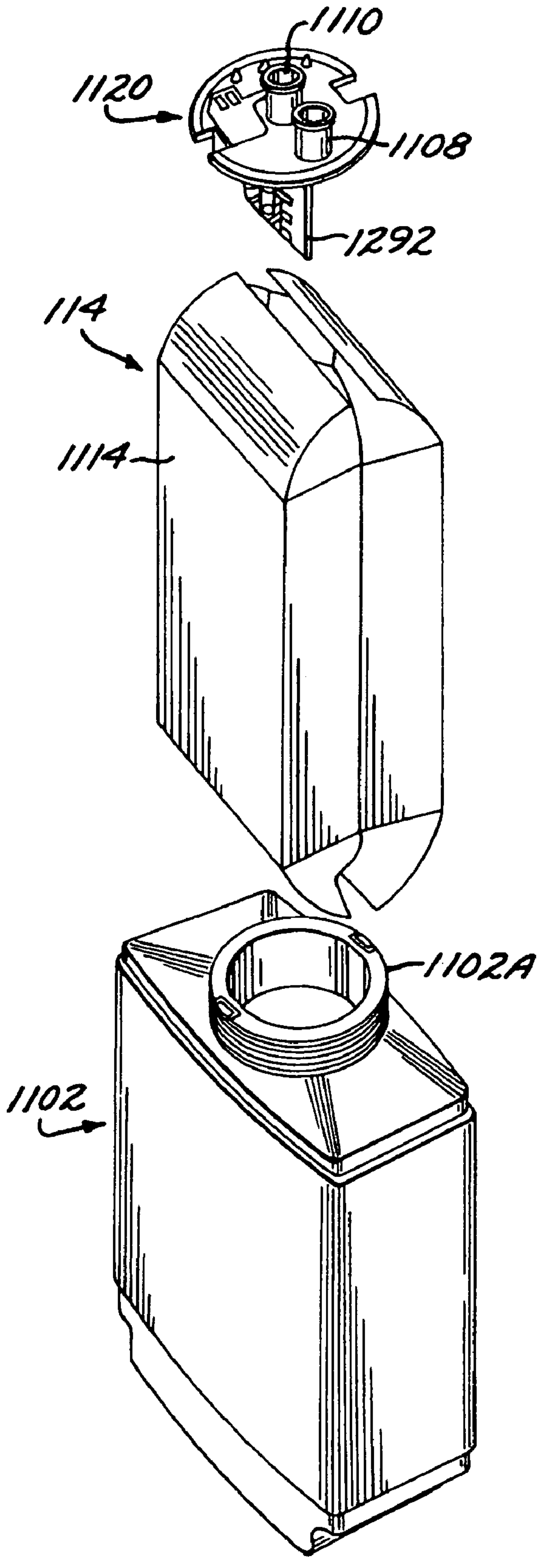
FIG. 8 is an exploded isometric view showing the pressure vessel, collapsible ink reservoir, and chassis member of the ink container of FIGS. 6 and 7.
Figure 9:
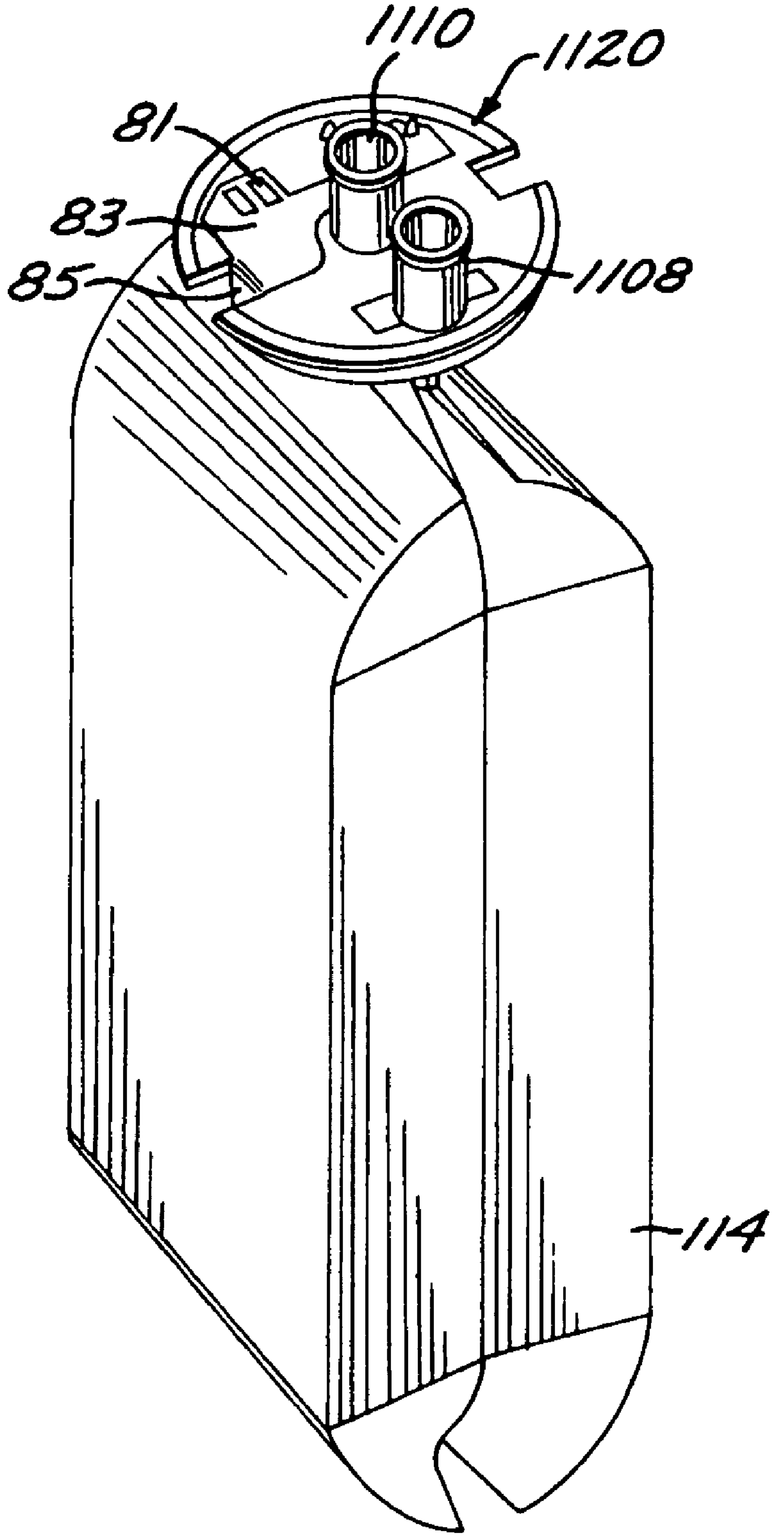
FIG. 9 is a schematic isometric view illustrating the collapsible ink reservoir and chassis member of the ink container of FIGS. 6 and 7.
Figure 10:
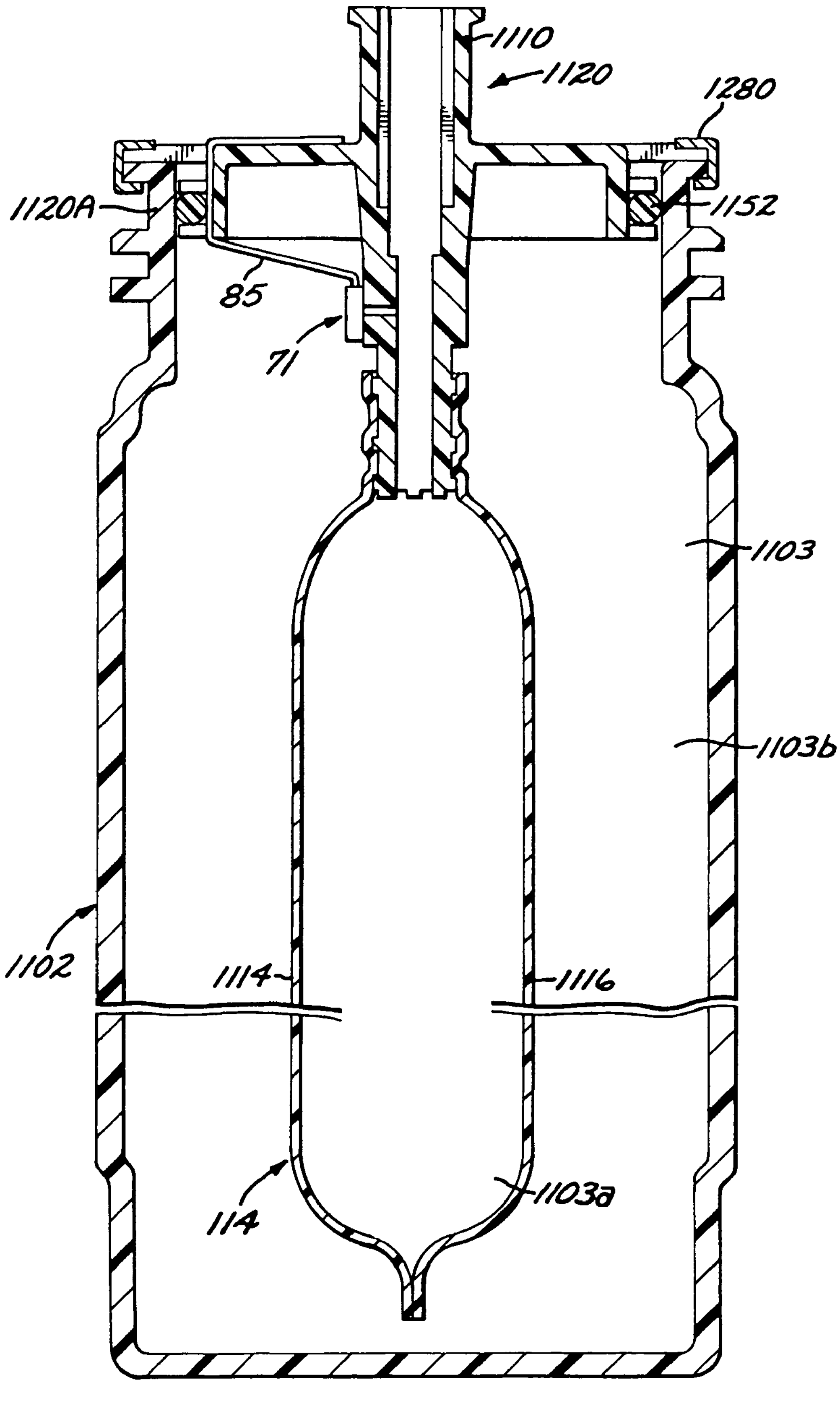
FIG. 10 is a cross-sectional view of the ink container of FIGS. 6 and 7, showing a pressure transducer disposed in the ink container.
Figure 11:
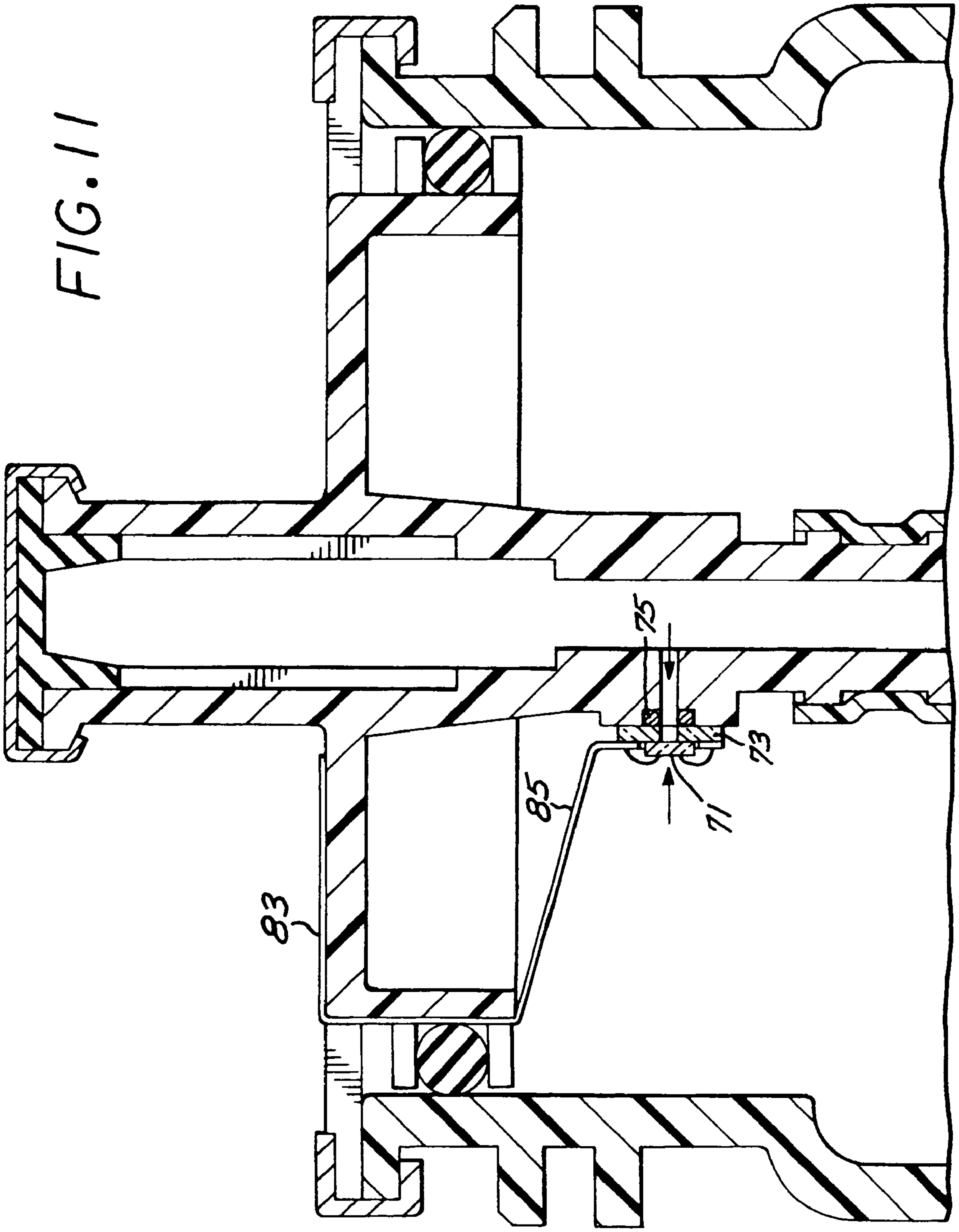
FIG. 11 is a cross sectional view illustrating the attachment of the pressure transducer to the chassis member of the ink container of FIGS. 6 and 7, and illustrating two exemplary embodiments of structures for improved the shock robustness of the pressure transducer.

As more particularly shown in FIGS. 8-10, the ink container 200 further includes a collapsible ink bag or reservoir 114 disposed in an interior chamber 1103 defined by the pressure vessel 1102 and sealingly attached to a keel portion 1292 of the chassis 1120 which seals the interior of the pressure vessel 1102 from outside atmosphere while providing for an air inlet 1108 to the interior of the pressure vessel 1102, and an ink outlet port 1110 for ink contained in the ink reservoir 114.

The chassis 1120 is secured to the opening of the neck region 1102A of the pressure vessel 1102, for example by an annular crimp ring 1280 that engages a top flange of the pressure vessel and an abutting flange of the chassis member. A pressure sealing O-ring 1152 suitably captured in a circumferential groove on the chassis 1120 engages the inside surface of the neck region 1102A of the pressure vessel 1102.

The collapsible ink reservoir 114 more particularly comprises a pleated bag having opposing walls or sides 1114, 1116. In an exemplary construction, an elongated sheet of bag material is folded such that opposed lateral edges of the sheet overlap or are brought together, forming an elongated cylinder. The lateral edges are sealed together, and pleats are in the resulting structure generally in alignment with the seal of the lateral edges. The bottom or non-feed end of the bag is formed by heat sealing the pleated structure along a seam transverse to the seal of the lateral edges. The top or feed end of the ink reservoir is formed similarly while leaving an opening for the bag to be sealingly attached to the keel portion 1292 of the chassis 1120. By way of specific example, the ink reservoir bag is sealingly attached to keel portion 1292 by heat staking.

The collapsible ink reservoir 114 thus defines an occupied portion 1103*a* of the interior chamber 1103, such that an unoccupied portion 1103*b* of the interior chamber 1103 is formed between the pressure vessel 1102 and the collapsible ink reservoir 114. The air inlet 1108 is the only flow path into or out of the unoccupied portion 1103*b* which functions as an air pressure chamber, and more particularly comprises a fluid conveying conduit that is in communication with the unoccupied portion 1103*b* of the interior chamber 1103. The ink outlet port 1110 is the only flow path into or out of the occupied portion 1103*a* and comprises a fluid conveying conduit that is in communication with the occupied portion 1103*a* of the interior chamber 1103, namely the interior of the collapsible ink reservoir 114. The ink outlet port 1110 is conveniently integrated with the keel portion 1292 of the chassis 1120.

As more specifically shown in FIGS. 10-16, a pressure transducer 71 is disposed in the interior chamber 1103 so as to detect a difference between a pressure of the unoccupied portion 1103*b* of the interior chamber 1103 and a pressure of ink in the collapsible ink reservoir 114 (i.e., a differential pressure), or an absolute pressure of ink in the collapsible ink reservoir 114. By way of illustrative example, the pressure transducer 71 is mounted on a ceramic substrate 73 to form a transducer subassembly that is attached to an outside wall of the output port 1110. A bore or opening in the wall of the output port 1110 and a bore or opening in the substrate 73 expose the pressure transducer to pressure in the output port 1110. Appropriate sealing including an O-ring 75 is provided to prevent leakage between the interior of the outlet port 1110 and the unoccupied portion 1103*b* of the interior chamber 1103. The pressure transducer 71 is very close to the ink supply in the collapsible ink reservoir 114 so as to avoid dynamic losses between the ink supply and the point of pressure measurement, and thus the pressure transducer 71 is effectively exposed to the pressure in the collapsible ink reservoir 114.

The electrical output of the pressure transducer 71 is provided to externally accessible contact pads 81 disposed on the top of the chassis 1120 via conductive leads 83 of a flexible printed circuit substrate 85 that extends between the ceramic substrate and the top of the chassis 1120, passing on the outside surface of the chassis 1120 between the O-ring 1152 and such outside surface. The conductive leads 83 are electrically connected to the externally accessible contact pads 81 disposed on the top of the chassis which can be formed on one end of the flexible printed circuit substrate 85 that would be attached to the top of the chassis 1120. The output of the pressure transducer 71 can be sampled while printing which avoids the need to interrupt printing to take a reading.

Optionally, a memory chip package 87 can be conveniently mounted on the ceramic substrate 87 and interconnected to associated externally accessible contact pads by associated conductive leads 83 of the flexible printed circuit substrate 85.

The pressure of the ink supply (for example as detected via the ink supply line) remains approximately equal to the pressure of the pressurizing gas (for example in the pressure line) for much of the ink supply life, and thus the differential pressure is approximately zero for much of the ink supply life. As the ink supply approaches an empty condition, the pressure of the ink supply decreases with decreasing remaining ink, whereby the differential pressure increases with decreasing ink. The relationship between differential pressure and the amount of ink remaining is reasonably consistent for any given system and can be reliably characterized.

A low ink level warning can optionally provided when the supply pressure decreases below a selected supply pressure threshold that is indicative of a low ink level threshold.

In an exemplary embodiment, the pressure sensor 71 is fabricated on a silicon die, which is positioned over the opening 73A formed in the substrate 73. In this exemplary embodiment, the sensor is a commercially available part, e.g. a Silicon Microstructure SM5102-005 pressure sensor, having a die size of about 2 mm by 2 mm by 0.9 mm high. In accordance with this invention, means are provided for improving the robustness of the pressure sensor 71 to high frequency pressure waves or pressure shocks, i.e. sudden spikes or increases in the pressure differential being monitored by the pressure sensor. Such pressure shocks can be the result of, for example, a full ink supply being dropped or roughly handled during manufacture, shipping or other handling.

Embodiments of the invention include mechanical filters, serving as protection structures, configured to prevent high-frequency pressure shocks from damaging the pressure sensor, while not substantially affecting static and low frequency measurements.

Figure 12:
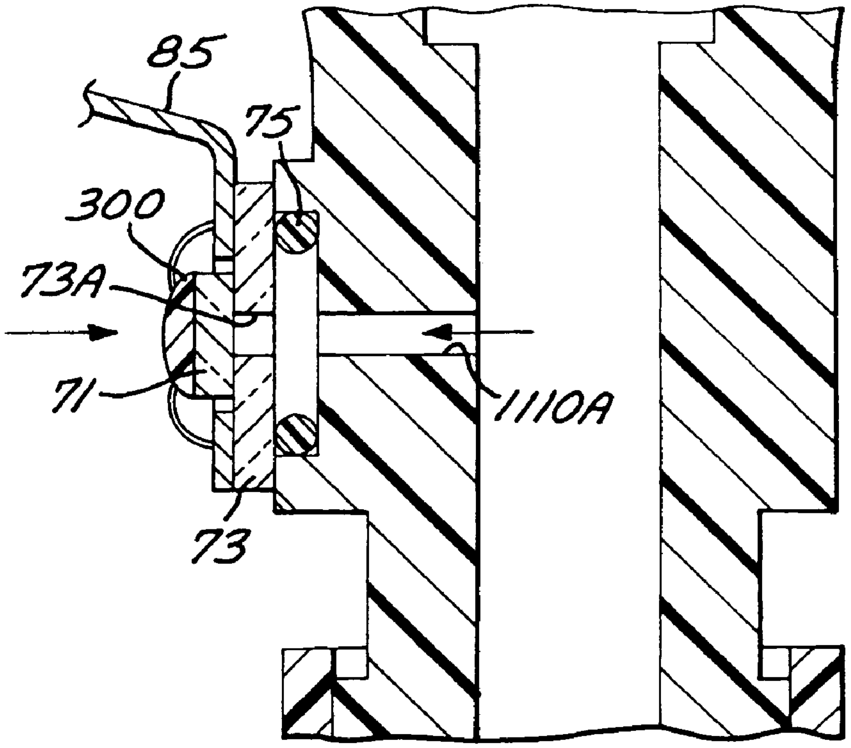
FIG. 12 is a broken-away cross-sectional view of a portion of the ink container of FIG. 10, and showing a mass of low-stiffness material on the outer surface of the transducer die.
Figure 13:
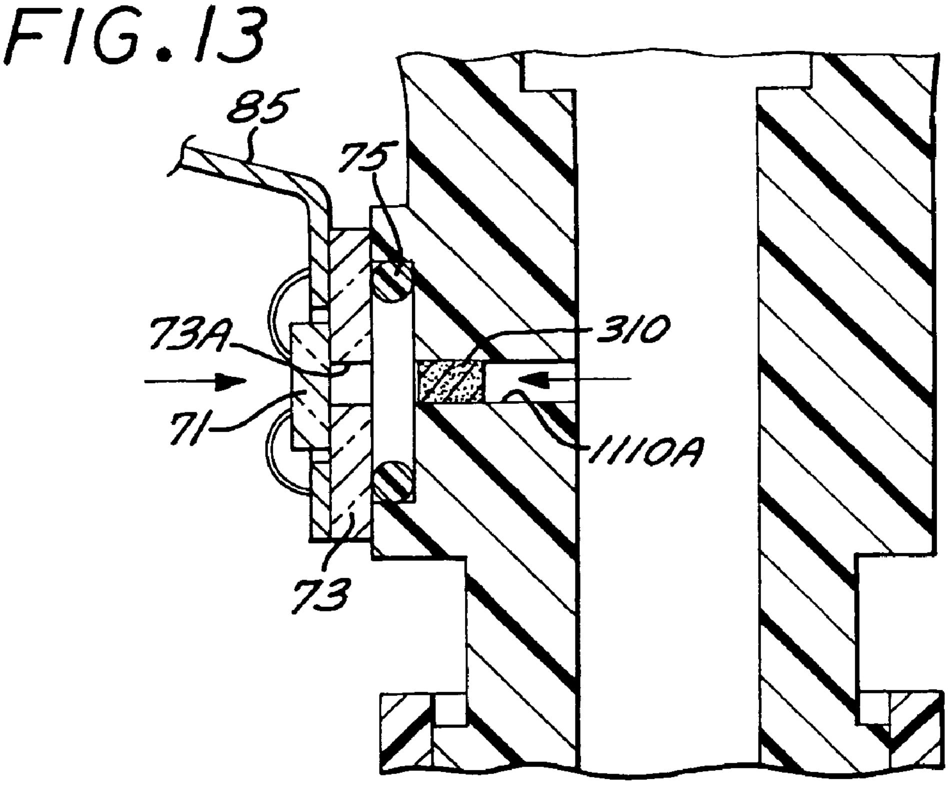
FIG. 13 is a broken-away cross-sectional view of a portion of the ink container of FIG. 10, and showing a porous plug fitted into the fluid passageway leading to the pressure transducer to dampen high-frequency shock waves.
Figure 14:
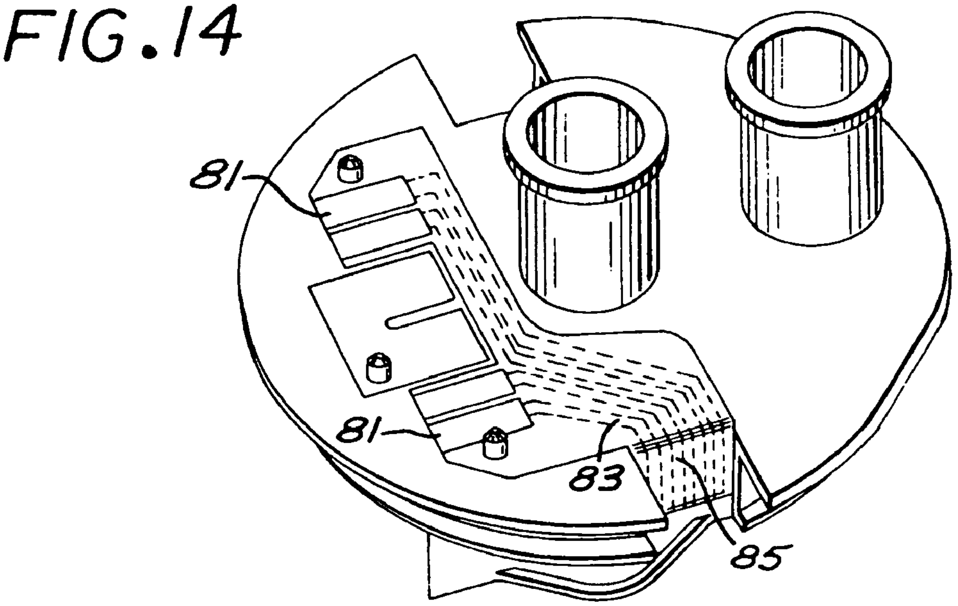
FIG. 14 is an isometric view illustrating electrical contacts disposed on the top portion of the chassis member of the ink container of FIGS. 6 and 7.
Figure 15:
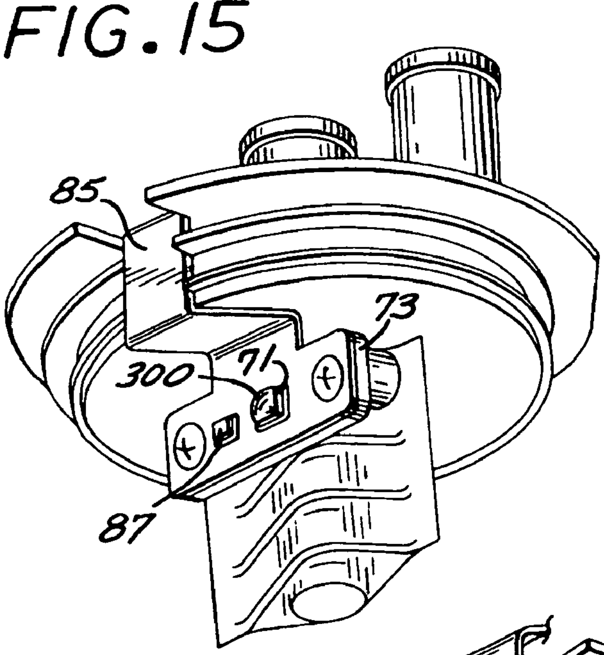
FIG. 15 is an isometric view illustrating the attachment of the pressure transducer to the chassis member of the ink container of FIGS. 6 and 7, with the mass of low-stiffness material of FIG. 12.
Figure 16:
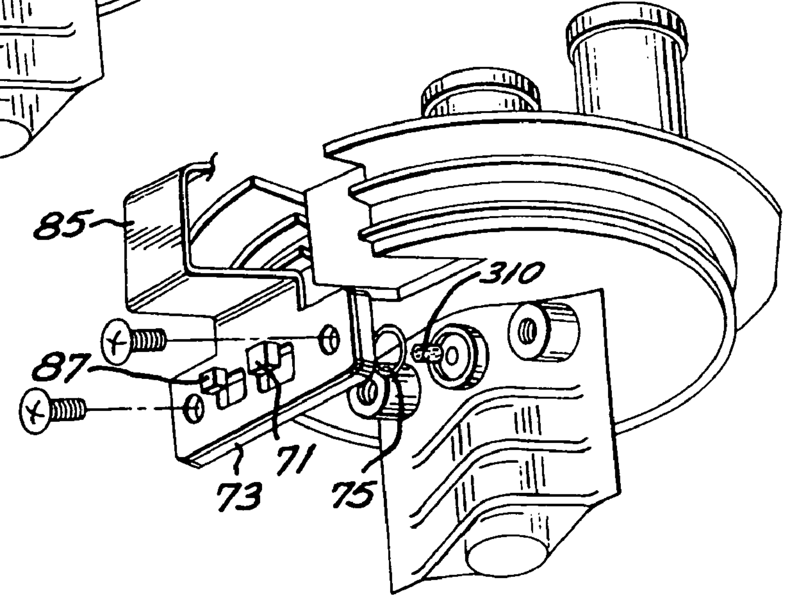
FIG. 16 is an exploded view illustrating the pressure transducer and the chassis member of the ink container of FIGS. 6 and 7, and showing the porous plug of FIG. 13.

In a first embodiment, a mechanism for dampening the high frequency pressure waves comprises a mass of low-stiffness material 300 such as a low stiffness adhesive deposited over the exterior of the sensor die, as illustrated in FIGS. 12, 13 and 16. The low-stiffness material is flexible enough to allow the pressure sensor die, which forms a pressure sensor diaphragm in this embodiment, to deflect in response to pressure differentials as intended, while dampening deflections in response to high frequency pressure waves. The mass of material improves the shock robustness of the sensor. An exemplary material suitable for the purpose as the low-stiffness material is silicon RTV (room temperature vulcanizing) sealant/adhesive. Tests indicate significant improvement in pressure shock robustness from application of the low-stiffness material 300 covering some or all of the exterior surface of the sensor die 71, with only relatively small reduction in sensitivity of the pressure sensor. The low-stiffness material can also cover some or all of the external surface of the substrate 73 without significant effect on the operation of the pressure sensor. Preferably, the mass 300 is large enough to cover the surface of the sensor die, in this exemplary embodiment at least 2 mm by 2 mm.

In another embodiment of a means for improving the robustness of the pressure sensor to pressure spikes, a porous plug 310 is fitted between the fluid path 1110A leading to the pressure sensor, i.e. between the main body of the fluid and the pressure sensor. In an exemplary embodiment, the plug 310 is a porous metal plug, e.g. a sintered stainless steel plug having a pore size on the order of 10 micrometers, although other pore sizes can alternatively be employed. For example, pore sizes in the range of 0.5 micrometer to 20 micrometers can provide protection against pressure spikes. The plug acts as a low-pass filter and passes gradual changes in pressure to the pressure sensor, but not pressure spikes. In an exemplary embodiment, the plug has respective diameter and length dimensions on the order of 1.3 mm and 2 mm. Other plug embodiments could alternatively be employed, e.g. plugs fabricated of porous ceramic or plastic materials.

Tests of these techniques for improving shock robustness indicate that, for the disclosed exemplary embodiments, both techniques significantly improve the robustness of the pressure sensors to pressure spikes. These tests indicate moderate improvement to shock robustness with little loss of sensor sensitivity for the mass of low-stiffness material 300. The porous pressure dampener 310 virtually eliminated failures due to shock.

A third exemplary embodiment of a means for improving the robustness of the pressure sensor to pressure spikes is illustrated in FIGS. 17-20. A labyrinth o-ring gasket structure 320 replaces the o-ring 75 of the embodiment of FIG. 11, between the interior of the outlet port 1110 and the unoccupied portion 1103*b* of the interior chamber 1103, and is sandwiched in a face seal arrangement between the chassis o-ring gland recess 1120B (FIGS. 19-20) and the sensor substrate 73. Pressure spikes are attenuated by the labyrinth o-ring structure which forms a low pass filter. The seal structure has symmetrical features on the bottom, reservoir side 320A and front, sensor side 320B (FIGS. 17 and 18).

The structure 320 includes a diaphragm portion 321 (FIG. 19) which covers most of the inner diameter of the o-ring structure. An outer circumferential gland 324 extends about the periphery of the o-ring structure. An inner C-shaped gland 326 is spaced between a central surface region 328 and the outer gland 324, and has an opening 326A (reservoir side) and 326B (sensor side) defined in the wall defining the gland. Channels 330A (reservoir side) and 330B (sensor side) are formed between the glands 322, 324. A through hole 322 is formed through the diaphragm portion 321 of the o ring structure between the outer gland 324 and the inner gland 326, and permits fluid flow between the reservoir side and sensor side of the o-ring.

The labyrinth o-ring structure 320 operates in the following manner. Ink in the chassis passage 1110A entering from the reservoir at the center 328A of the inner gland 326 is forced to flow along flow path 332A through the opening 326A into the channel 330A, around either side of the inner gland to the through hole 322. Ink flowing through the hole 322 from the reservoir side to the sensor side then passes along path 332B in channel 330B to the opening 326B in the inner gland to the center 328B, and then to the center 328B, from which ink flows to the sensor 71. When a pressure impulse occurs, the outer gland 324 provides compliance, and the narrow flow path defined by path portions 332A, 332B and the hole 322 provides dampening. The result is an attenuated pressure spike on the sensor side.

The labyrinth o-ring structure is a unitary part, typically an injection molded structure, fabricated of an elastomeric material. Exemplary materials suitable for the purpose include Butadiene Acrylonitrile (Nitrile) and EPDM. Nitrile elastomers can provide improved barrier properties with respect to air diffusion.

Improved performance of the o-ring structure 320 may be obtained for some applications by employing a relatively thin outer gland 324. This gland assists in shock suppression as a complaint member of the structure; unduly increasing its thickness can substantially reduce its compliance.

Exemplary dimensions of the o-ring structure 320 for a particular application are as follows: outer diameter, 3.6 mm; diaphragm thickness, 0.2 mm; outer gland thickness, 0.4 mm; inner gland thickness, 0.3 mm; through hole diameter, 0.3 mm.

Various modifications can be made to the gasket structure. The structure need not have a circular periphery, for example. Also, instead of providing dual flow paths on each side of the o-ring, a configuration can be employed with a single flow path, with the inner gland having one end which ends at the outer gland. Such an alternate configuration is shown in FIG. 21. Here, the o-ring structure 350 has a through hole 352, an outer gland 354 and an inner gland 356. The inner gland 356 is not completely circular, but instead is hook-shaped, with gland end 356A molded into the outer gland adjacent the through hole 352. The flow path 360 from the center region 358 defines a single path, instead of splitting into two path portions as in the embodiment of FIGS. 17-20. This increases the effective flow path length.

FIGS. 22-24 illustrate an embodiment of a labyrinth seal structure 380. The structure 380 includes a diaphragm or web portion 381 which covers most of the inner area of the structure. The structure has opposed reservoir and sensor sides, which are mirror images of each other. An outer circumferential gland 384 extends about the periphery of the structure 380, with a rib 396 protruding from the outer side of the gland 384. An inner C-shaped gland 386 is spaced between a central surface region 388 and the outer gland 384, and has an opening 386A (reservoir side) and 386B (sensor side) defined in the wall defining the C-shaped gland. A wall or rib 389 is positioned 180 degrees around the C-shaped gland from the opening 386A, connected between the gland 386 and the outer gland 384. Channels 390A-1 and 390A-2 (reservoir side) and 390B-1 and 390B-2 (sensor side) are formed between the glands 384, 386 on opposite sides of the wall 389.

Through holes 382A, 382B are formed through the web portion 381 of the gasket structure 380 between the outer gland 384 and the inner gland 386, and permit fluid flow between the reservoir side and sensor side of the gasket structure 380. In an exemplary embodiment, the holes may be spaced apart by 90 degrees, although this may vary depending on the particular application.

The labyrinth gasket structure 380 operates in the following manner. Ink in the chassis passage 1110A entering from the reservoir at the center 388A of the inner gland 386 is forced to flow along flow paths 392A-1, 392A-1 through the opening 386A into the channels 390A-1, 390A-2, around either side of the inner gland 386 to the through holes 382A, 382B. Ink flowing through the holes 382A, 382B from the reservoir side to the sensor side then passes along paths 392B-1, 392B-2 in channels 390B-1, 390B-2 to the opening 386B in the inner gland to the center 388B, from which ink flows to the sensor 71. When a pressure impulse occurs, the outer gland 384 provides compliance, and the narrow flow paths defined by path portions 392A-1, 392A-2, 392B-1, 392B-2 and the holes 382A, 382B provides dampening. The result is an attenuated pressure spike on the sensor side.

The gasket structure 380 with a redundant flow path structure through multiple through holes allows redundant fluid communication in the through-hole region at spaced intervals. The external rib 396 adds structure to reduce the sheer of the outer wall which can lead to through-hole blockage. The rib 389 adds structure to reduce the sheer of the outer gland 384, which can lead to through hole blockage. The redundant architecture of the gasket structure may reduce blockage caused by variation in the assembly process, such as shearing of the gasket due to non-vertical assembly motion, variation in material sizes, presence of foreign bodies, or swelling of the gasket material due to exposure to solvents which may be included in the fluid. Fluid movement and pressure is communicated through the redundant flow path structure which may serve, in an exemplary embodiment, both a resistive function and a compliant function. The labyrinth seal structure in an exemplary embodiment attenuates high-frequency signals and passes low frequency signals in fluid movement and pressure. In an exemplary embodiment, the redundant flow path structure attenuates fluid pressure spikes with periods less than two seconds.

The gasket structure 380 in an exemplary embodiment is an integral one-piece structure, molded from an elastomer, such as, for example, Nitrile rubber or EPDM. The through hole diameters may be in a range of 0.01 mm to 5 mm.

FIGS. 25-27 illustrate another embodiment of a gasket structure 400. The structure 400 is similar to the gasket structure 380, except that the inner gland 406 in the form of a horse shoe, and a wall or rib 418 extends from the outer gland 404 into the horse shoe opening, providing redundant flow paths into the inner gland 406 to the center region 408A of the gasket structure on either side of the wall 418.

The gasket structure 400 includes a web portion 401 which covers most of the inner area of the structure. The structure has opposed reservoir and sensor sides, which are mirror images of each other. The outer circumferential gland 404 extends about the periphery of the structure 400, with a rib 416 protruding from the outer side of the gland 404. The inner horse shoe shaped gland 406 is spaced between the central surface region 408A and the outer gland 404, and has an opening in the wall defining the gland 406. As noted above, wall 418 protrudes from the outer gland into the horse-shoe opening, forming channels 406A1 and 406A-2. A wall or rib 409 is positioned 180 degrees around the horse shoe-shaped gland 406 from the opening 406A, connected between the gland 406 and the outer gland 404. Channels 410A-1 and 410A-2 (reservoir side) and 410B-1 and 410B-2 (sensor side) are formed between the glands 404, 406 on opposite sides of the wall 389.

Through holes 402A, 4022B are formed through the web portion 401 of the gasket structure 400 between the outer gland 404 and the inner gland 406, and permit fluid flow between the reservoir side and sensor side of the gasket structure 406. In an exemplary embodiment, the holes may be spaced apart by 90 degrees, although this may vary depending on the particular application.

The labyrinth gasket structure 400 operates in the following manner. Ink in the chassis passage 1110A entering from the reservoir at the center 408A of the inner gland 406 is forced to flow along flow paths 412A-1, 412A-2 through the openings 406A-1, 406A-2 into the channels 410A-1, 410A-2, around either side of the inner gland 406 to the through holes 402A, 402B. Ink flowing through the holes 402A, 402B from the reservoir side to the sensor side then passes along paths 412B-1, 412B-2 in channels 410B-1, 410B-2 to the openings 406B-1, 406B-2 in the inner gland to the center 408B, from which ink flows to the sensor 71. When a pressure impulse occurs, the outer gland 404 provides compliance, and the narrow flow paths defined by path portions 412A-1, 412A-2, 412B-1, 412B-2 and the holes 412A, 412B provides dampening. The result is an attenuated pressure spike on the sensor side.

The gasket structure 400 with multiple through holes allows redundant fluid communication in the through-hole region at exemplary 90 degree intervals. The external rib 416 adds structure to reduce the sheer of the outer wall which can lead to through-hole blockage. The wall 418 provides parallel double flow channels into the center region 408A, which are more robust against closing when the outer gland 404 is pushed in the direction of arrow 420. The redundant architecture of the gasket structure may reduce blockage caused by variation in the assembly process, such as shearing of the gasket due to non-vertical assembly motion, variation in material sizes, presence of foreign bodies, or swelling of the gasket material due to exposure to solvents which may be included in the fluid.

The gasket structure 400 in an exemplary embodiment is an integral one-piece structure, molded from an elastomer, such as, for example, Nitrile rubber or EPDM. The through hole diameters may be in a range of 0.01 mm to 5 mm.

The gasket structures provide a seal function integrated with a pressure shock dampening function, and thus provide the advantage of accomplishing both functions with a single part.

While the foregoing fluid supply implementation applies greater than ambient pressure to the ink supply, the techniques for protecting the sensor against pressure spikes can be employed in systems wherein the ink supply is subjected only to ambient or atmospheric pressure instead of a pressure that is greater than atmospheric pressure, for example in a system wherein a non-pressurized ink supply is elevated so that ink flows out of the ink container by gravity. Also, the disclosed techniques can be employed in other printing or marking systems that employ liquid ink such as liquid electrophotographic printing systems.

Although the foregoing has been a description and illustration of specific embodiments of the invention, various modifications and changes thereto can be made by persons skilled in the art without departing from the scope and spirit of the invention as defined by the following claims.

What is claimed is:

1. A labyrinth seal structure comprising:

a gland structure for providing a fluid seal between a first surface and a second surface; and redundant labyrinth fluid flow paths disposed on each of a first side of the seal structure and a second side of the seal structure, all the flow paths having common terminal points at common central regions of the first side and the second side, and each flow path having different channels on and between the first side and the second side.

2. The labyrinth seal structure of claim 1, further including a web portion, and wherein said redundant labyrinth fluid flow paths comprise a first through hole and a second through hole formed in the web portion between the first side and the second side.

3. The labyrinth seal structure of claim 2, and said gland structure comprises an inner gland portion and an outer gland portion.

4. The labyrinth seal structure of claim 3, wherein said redundant fluid flow paths include a first flow path extending from a center region of said seal structure on said first side, along a first channel extending between said inner and outer gland portions on said first side, through said first through hole to a second channel between said inner and outer gland portions on said second side to a center region of said seal structure on said second side.

5. The labyrinth seal structure of claim 4, wherein said redundant flow paths include a second flow path extending from a center region of said seal structure on said first side, along a third channel extending between said inner and outer gland portions on said first side, through said second through hole to a fourth channel between said inner and outer gland portions on said second side to a center region of said seal structure on said second side.

6. The labyrinth seal structure of claim 2, wherein said first and second through holes have diameters in a range of 0.01 mm to 5 mm.

7. The labyrinth seal structure of claim 1, wherein said first side of said seal structure and said second side of said seal structure are mirror images.

8. The labyrinth seal structure of claim 1, wherein said seal structure is fabricated of an elastomeric material.

9. The labyrinth seal structure of claim 1, wherein said seal structure is an integral one-piece structure, fabricated by molding from an elastomeric material.

10. The labyrinth seal structure of claim 1, further comprising a circumferential rib disposed on an outer surface of said gland structure.

11. The labyrinth seal structure of claim 1, wherein said gland structure has a circular configuration.

12. The labyrinth seal structure of claim 1, wherein said gland structure comprises an inner gland structure and an outer gland structure, and said inner gland structure has a C-shaped configuration.

13. The labyrinth seal structure of claim 1, wherein said gland structure comprises an inner gland structure and an outer gland structure, and said inner gland structure has a horse shoe-shaped configuration.

14. The labyrinth seal structure of claim 13, wherein said gland structure further comprises a stub wall structure extending from said outer gland structure into an open end of said horse-shoe-shaped configuration of said inner gland structure.

15. A labyrinth seal structure comprising:

a web portion;

a gland structure for providing a fluid seal between a first surface and a second surface, said gland structure comprising an inner gland portion and an outer gland portion connected by a region of said web portion, the outer gland portion defining a continuous circumferential gland about an outer periphery of the seal structure; and a redundant flow path structure allowing redundant fluid communication from a central region on a first side of the seal structure to a central region on a second side of the seal structure through a plurality of different channel pairs on the first side and the second side, each channel pair having a different through hole formed in said region of the web portion between the first side and second side.

16. The labyrinth seal structure of claim 15, wherein said redundant fluid flow path structure comprises a first flow path extending from a center region of said seal structure on said first side, along a first channel extending between said inner and outer gland portions on said first side, through a first through hole of said multiple through holes to a second channel between said inner and outer gland portions on said second side to a center region of said seal structure on said second side.

17. The labyrinth seal structure of claim 16, wherein said redundant flow path structure further includes a second flow path extending from a center region of said seal structure on said first side, along a third channel extending between said inner and outer gland portions on said first side, through a second through hole of said multiple through holes to a fourth channel between said inner and outer gland portions on said second side to a center region of said seal structure on said second side.

18. The labyrinth seal structure of claim 17, further comprising a wall extending between an edge of said inner gland structure adjacent an open region in said inner gland structure and said outer gland structure.

19. The labyrinth seal structure of claim 18, wherein through hole is positioned adjacent said wall so that said wall blocks fluid passage directly between said through hole and said open region of said inner gland structure.

20. The labyrinth seal structure of claim 15, wherein said seal structure is an integral one piece structure fabricated of an elastomeric material.

21. The labyrinth seal structure of claim 15, further comprising a circumferential rib disposed on an outer surface of said outer gland structure.

22. The labyrinth seal structure of claim 15, wherein said inner gland structure has a C-shaped configuration.

23. The labyrinth seal structure of claim 15, wherein said inner gland structure has a horse shoe-shaped configuration.

24. The labyrinth seal structure of claim 23, wherein said gland structure further comprises a stub wall structure extending from said outer gland structure into an open end of said horse-shoe-shaped configuration of said inner gland structure.

25. A method for allowing fluid flow between a fluid conduit having an opening in a first surface and a second surface while protecting the second surface against sudden fluid pressure spikes, comprising:

sandwiching a gland structure of an elastomeric labyrinth seal structure between the first surface and the second surface under compression to create a fluid seal:

allowing fluid to flow from the fluid conduit opening in the first surface through redundant labyrinth fluid flow paths between and along a first side of the seal structure and a second side of the seal structure, wherein each of the redundant fluid flow paths includes a channel on the first side, a through hole formed through a web portion of the labyrinth seal structure, and a channel on the second side.

26. The method of claim 25, wherein said sandwiching a gland structure comprises sandwiching a gland structure comprising a continuous outer gland structure and an inner non-continuous gland structure between said first surface and said second surface.

27. The method of claim 26, wherein said allowing fluid to flow includes:

allowing the fluid to flow through said redundant labyrinth fluid flow paths includes allowing the fluid to flow through a first fluid flow path extending from a center region of said seal structure on said first side, through an open region in said inner gland structure, along a first channel extending between said inner and outer gland portions on said first side, through said first through hole to a second channel between said inner and outer gland portions on said second side and through an open region in said inner gland portion on said second side to a center region of said seal structure on said second side within said inner gland portion.

28. The method of claim 27, wherein said allowing fluid to flow includes:

allowing the fluid to flow through said redundant labyrinth fluid flow paths includes allowing the fluid to flow through a second fluid flow path extending from a center region of said seal structure on said first side, through an open region in said inner gland structure, along a third channel extending between said inner and outer gland portions on said first side, through said second through hole to a fourth channel between said inner and outer gland portions on said second side and through an open region in said inner gland portion on said second side to a center region of said seal structure on said second side within said inner gland portion.

29. A fluid containment device, comprising:

a reservoir structure for holding a supply of fluid;

a sensor port in fluid communication with the reservoir structure;

a sensor mourned at the sensor port, the sensor including a substrate and a sensor die mounted on the substrate, the sensor die responsive to fluid pressure differentials to generate an electrical sensor signal; and means for protecting the sensor die against sudden fluid pressure spikes, said means comprising a labyrinth seal structure comprising a gland structure for providing a fluid seal between said sensor port and said substrate; and redundant labyrinth fluid flow paths between a first side of the seal structure and a second side of the seal structure.

30. A pressure sensor device, comprising:

a substrate having opposed first and second surfaces:

a pressure sensitive structure attached to said substrate and responsive to a pressure differential between a first fluid pressure applied to the first surface and a second fluid pressure applied to the second surface to provide an electrical sensor signal indicative of said pressure differential, said protection structure comprising a labyrinth seal structure positioned between the sensor and the sensor port, said seal structure including a gland structure for providing a fluid seal, and a redundant labyrinth fluid flow path structure providing redundant flow paths through multiple through holes between a reservoir side of the seal structure and a sensor side of the seal structure.

31. A labyrinth seal structure comprising:

a first side and an opposing second side;

a gland structure disposed on the first side and the second side and adapted to engage a first surface and a second surface to provide a fluid seal therebetween;

a plurality of redundant labyrinth fluid flow paths disposed on each of the first side and the second side, wherein each one of the labyrinth fluid flow paths is a different first channel on the first side fluidically coupled through a different hole in the labyrinth seal structure to a corresponding different second channel on the second side, and terminates at a first central region of the first side and a second central region of the second side.

32. The labyrinth seal structure of claim 31, further comprising a plurality of through holes between the first side and the second side, wherein each of the through holes connects one of the labyrinth fluid flow paths on the first side to a corresponding one of the labyrinth fluid flow paths on the second side.

33. The labyrinth seal structure of claim 32, further comprising a web portion, wherein the plurality of through holes are formed in the web portion.

34. The labyrinth seal structure of claim 31, wherein each of the labyrinth fluid flow paths on the first side extends from a center region of the first side and each of the labyrinth fluid flow paths on the second side extends to a center region of the second side.

35. A labyrinth seal structure comprising:

a gland structure for providing a fluid seal in a face seal arrangement between a first surface and a second surface; and redundant labyrinth fluid flow paths disposed on each of a first side of the seal structure and a second side of the seal structure, wherein each flow path extends from a common center region on the first side, along a first channel on the first side, through a hole in the seal structure to a second channel on the second side, to a common center region on the second side, and wherein the first and second channels and the hole are different for each flow path.

* * * * *

UNITED STATES PATENT AND TRADEMARK OFFICE

CERTIFICATE OF CORRECTION

PATENT NO. : 7,465,040 B2

APPLICATION NO. : 11/188480

DATED : December 16, 2008

INVENTOR(S) : Craig L. Malik et al.

It is certified that error appears in the above-identified patent and that said Letters Patent is hereby corrected as shown below:

In column 11, line 40, in Claim 15, insert -- the -- before “second”.

In column 13, line 1, in Claim 29, delete “mourned” and insert -- mounted --, therefor.

Signed and Sealed this

Thirty-first Day of March, 2009

JOHN DOLL

*Acting Director of the United States Patent and Trademark Office*